United States Patent
Peterson et al.

(10) Patent No.: US 7,080,214 B2
(45) Date of Patent: Jul. 18, 2006

(54) DIRECTORY BASED SUPPORT FOR FUNCTION SHIPPING IN A MULTIPROCESSOR SYSTEM

(75) Inventors: James Lyle Peterson, Austin, TX (US); Ramakrishnan Rajamony, Austin, TX (US); Hazim Shafi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/687,261

(22) Filed: Oct. 16, 2003

(65) Prior Publication Data

US 2005/0086438 A1    Apr. 21, 2005

(51) Int. Cl.
*G06F 12/08* (2006.01)
(52) U.S. Cl. ...................... 711/141; 711/147
(58) Field of Classification Search ............. None
See application file for complete search history.

(56) References Cited

U.S. PATENT DOCUMENTS

| | | | |
|---|---|---|---|
| 5,625,811 A * | 4/1997 | Bhide et al. | 707/2 |
| 5,675,791 A * | 10/1997 | Bhide et al. | 707/205 |
| 6,683,850 B1 * | 1/2004 | Dunning et al. | 370/231 |
| 2004/0117345 A1 * | 6/2004 | Bamford et al. | 707/1 |
| 2004/0215639 A1 * | 10/2004 | Bamford et al. | 707/100 |
| 2004/0215640 A1 * | 10/2004 | Bamford et al. | 707/100 |

* cited by examiner

*Primary Examiner*—Kevin Verbrugge
(74) *Attorney, Agent, or Firm*—Casimer K. Salys; Dillon & Yudell LLP

(57) ABSTRACT

A multiprocessor system includes a plurality of data processing nodes. Each node has a processor coupled to a system memory, a cache memory, and a cache directory. The cache directory contains cache coherency information for a predetermined range of system memory addresses. An interconnection enables the nodes to exchange messages. A node initiating a function shipping request identifies an intermediate destination directory based on a list of the function's operands and sends a message indicating the function and its corresponding operands to the identified destination directory. The destination cache directory determines a target node based, at least in part, on its cache coherency status information to reduce memory access latency by selecting a target node where all or some of the operands are valid in the local cache memory. The destination directory then ships the function to the target node over the interconnection.

20 Claims, 4 Drawing Sheets

(FUNC POINTER, OPERAND 1, OPERAND 2, ... , OPERAND N)

140 directory of the destination node so as to reduce
DIRECTORY BASED SUPPORT FOR FUNCTION SHIPPING IN A MULTIPROCESSOR SYSTEM This invention was made with Government support under NBCHC020056 awarded by DARPA. The Government has certain rights in this invention.

BACKGROUND

1. Field of the Present Invention

The present invention is in the field of multiprocessor systems and more specifically to multiprocessor systems that use function shipping to reduce memory access latency.

2. History of Related Art

In multiprocessor systems, reductions in access latencies to remote data are not keeping pace with increases in processor speeds and, as a result, access latency is a potentially performance limiting issue. Function shipping is a known technique to address access latency issues. Function shipping refers generally to a procedure in which an is operation forwarded to and executed on a remote node, hopefully a node where the function's operands are local. While function shipping is theoretically desirable, determining the best node on which to execute a particular function is not trivial. Currently, a compiler or the node originating a function shipping request determines the destination node. Unfortunately, it is exceedingly difficult to predict a priori where data operands will be local when a particular function is ready to execute. One can force data operands to reside on a particular node or to store or replicate an entire set of related data operands (sometimes referred to as a data object) on one or more nodes so that a single node has access to all possible operands on which a function might operate, but these approaches impose highly undesirable constraints on data storage. It would be desirable to implement a method and system for achieving function shipping where the destination node is determined at run time based on where data actually resides within the system without constraining the manner in which data is stored.

SUMMARY OF THE INVENTION

The identified objective is achieved in the present invention by a multiprocessor system comprised of a plurality of data processing nodes. Each node has at least one processor coupled to a system memory, a cache memory, and a cache directory. The cache directory contains cache coherency information for a predetermined range of system memory addresses. An interconnection network enables the nodes to exchange messages. A node initiating a function shipping request identifies a destination node based on the function's operands. The destination node is the node that has the cache coherency information for the greatest number of operands. A message is then sent to the destination node indicating the function and its corresponding operands. The destination cache directory then selects a target node where the function will be executed. The selection of the target node is based, at least in part, on the cache coherency status information in the cache directory of the destination node so as to reduce memory access latency by selecting a target node having a cache memory where preferably all, but at least some of the operands, are valid. The destination node then ships the function to the target node over the interconnection network for execution.

BRIEF DESCRIPTION OF THE DRAWINGS

Other objects and advantages of the invention will become apparent upon reading the following detailed description and upon reference to the accompanying drawings in which.

Figure 1:
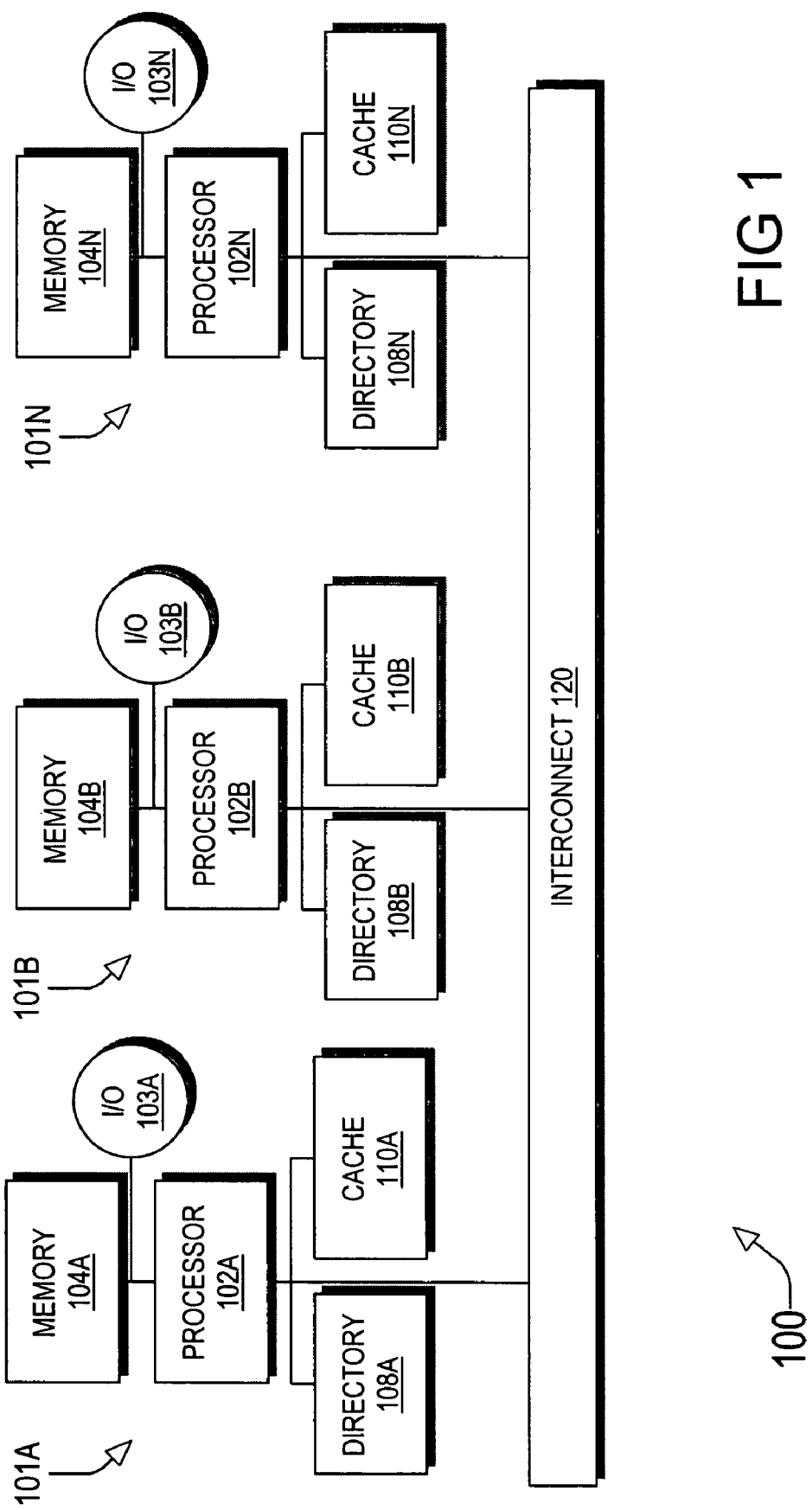
FIG. 1 is a block diagram of selected elements of a data processing system employing a cache coherency directory according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention facilitates efficient function shipping in a distributed memory, multiprocessor data processing system or network. When a function is to be shipped to another node, a message or data string indicating the function and the operand addresses is forwarded to the node (referred to herein as the destination node) having the cache directory (referred to herein as the destination directory) that contains coherency information for the greatest number of the function's operands. The destination directory then selects, based at least in part on which node(s) contain valid copies of the function's operands, a target node to execute the function. The ideal target node has a cache memory containing valid copies of all of the function's operands so that the function can be executed on the target node with low memory retrieval latency.

Figures 3, 4:
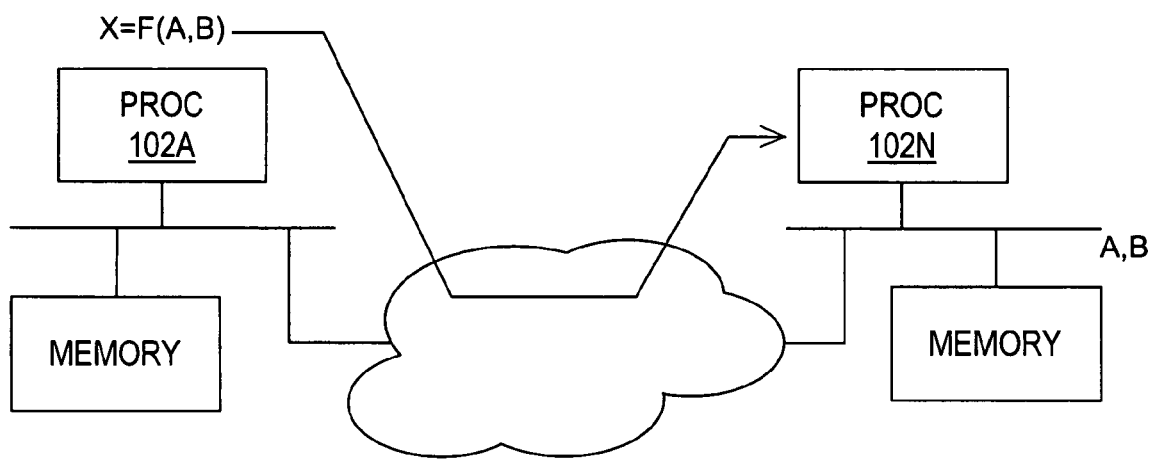
FIG. 3 is a conceptual representation of a scenario in which function shipping may be employed.
FIG. 4 illustrates a message type suitable for use in conjunction with the present invention.

As implied by the foregoing description, the invention is implemented in a directory-based, multiprocessor system environment. In this context, the invention takes advantage of static mapping between system memory addresses and cache directory locations. Using the static mapping, the node from which the function is initially shipped (the home node of the function) can easily determine the node having cache coherency information for the greatest number of operands. The home node of the function then forwards to this destination node a message or data string indicating a function identifier and a list of operands. The destination directory then evaluates the coherency status of all or at least some of the function operands to select the target node based on the memory access latency considerations, perhaps in conjunction with other information such as relative node loading and relative proximity of different nodes. The function is then shipped to the target node for execution. By considering the current locations of multiple operands, the present invention is able to optimize the node selection at run time to reduce memory access latency. FIG. 3 is a conceptual depiction of the invention according to one embodiment. A processor 102A issues a function X=F(A,B). The home node for the operands A and B is the node of processor 102N. Assuming that the cache memory of this node contains valid copies of operands A and B, the function is shown as being shipped to the node of processor 102N for efficient execution.

In the following discussion, it is important to distinguish and be precise when discussing home nodes and local nodes. A home node of any given system memory address, as used herein, is the node where the system memory address is located. A local node for any particular memory address, on the other hand, is a node(s) on which the corresponding cache memory contains a valid copy of the contents of the memory address. There may be multiple local nodes for a memory address but there is only one home node. Moreover, using the example above in which operands A, B, and X share a common home node, it may be the case that none of the operands are local in the cache memory of the home node.

Turning now to the drawings, FIG. 1 is a block diagram of selected elements of a multiprocessor system 100 according to one embodiment of the present invention. System 100 includes a plurality of data processing nodes 101A through 101N (collectively or generically referred to as node(s) 101). The set of nodes 101 are interconnected via an interconnection network (interconnect) 120 over which the nodes send messages to each other.

Each node 101 includes a corresponding processor 102, a system memory 104, a cache memory (cache) 110, a cache directory 108, and input/output (I/O) peripherals denoted by reference numeral 103. Each system memory 104 is a memory array having a predetermined range of memory addresses. A node 101 is the home node for the range of system memory addresses contained in the node's corresponding system memory 104.

The memory address ranges for each system memory 104 are non-overlapping and distinct such that the collection of system memories 104 forms a cumulative system memory for the multiprocessor system 100. In one implementation, the memory address range for each system memory 104 is contiguous. While a contiguous address implementation provides a simple mechanism for determining the home node for any given memory address (i.e., the high order address bits identify the home node), the requisite ability to determine the home node corresponding to any memory address may be provided in other ways (e.g., low order address bits identify the home node). In its most flexible embodiment, the collective system memory of the multiprocessor system is generally available to each processor of the system although specified memory address ranges may be inaccessible from remote nodes depending upon the implementation. Each processor 102 is generally capable of executing an instruction that references a remote memory address (a memory address having a home node that is different than the node on which the instruction is executing). In addition, each cache memory 110 is capable of caching copies of remote memory addresses. Thus, cache 110A of node 101A may contain valid copies of data from memory 104B of node 101B, memory 104C of node 101C, and so forth.

When the cache status of a memory address changes, the change may be recorded in the cache directory 108 that is responsible for the memory address. Typically, only certain status changes are recorded. For example, the transition from shared to exclusive is recorded. However, the transition from shared to invalid (caused, for example, by the cache dropping a line because of lack of capacity) is typically not recorded. In one embodiment that is particularly efficient in terms of implementation, the cache directory 108 or each node 101 contains cache coherency status information for the memory address range occupied by the node's system memory 104. Thus, directory 108A of node 101A maintains the cache status for all memory addresses occupied by system memory 104A, and so forth. If a change in the status of cache memory 110B affects a cache line corresponding to a memory address allocated to system memory 104A of node 101A, node 101B sends a message to the directory 108A to update the appropriate directory entry to reflect the new status. Efficiency and simplicity are achieved by maintaining a static mapping between memory addresses and directory nodes. As an overly simplistic example, a system comprised of eight nodes might determine the node on which a memory address resides and also, therefore, the node on which the corresponding directory resides using the three high order bits of the memory address. Thus, one can determine, based solely on a system memory address, the one and only node containing cache coherency status information for the system memory address.

Figures 5, 6:
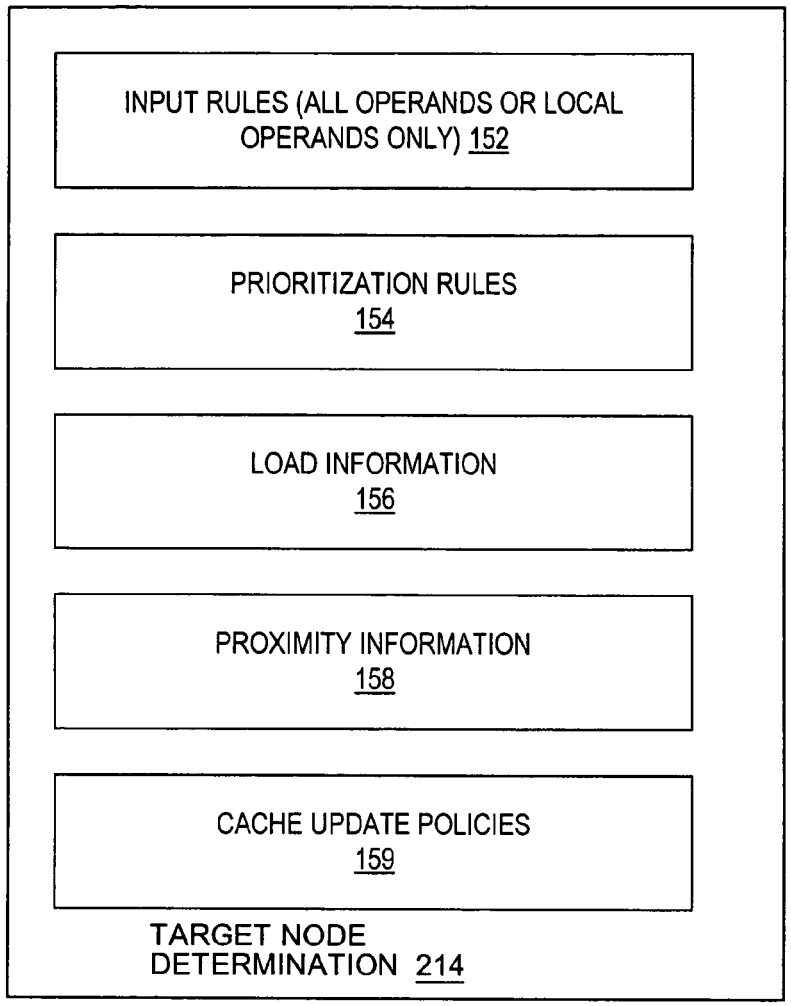
FIG. 5 is a conceptual representation of a target node selection process according to one embodiment of the present invention.
FIG. 6 illustrates a portion of the cache coherency directory of FIG. 1.

As briefly described above, multiprocessor system 100 may be characterized as a distributed memory multiprocessor system employing directory-based cache coherency. In directory-based coherency, the cache status of a particular memory address is maintained in a single location, namely, an entry in one of the cache directories. Each entry in a cache directory indicates the cache status, on all nodes, of the corresponding memory address. Referring to FIG. 6, a pair of entries 161, 162 from an exemplary cache coherency status information table 160 of cache directory 108 suitable for use in conjunction with the present invention is shown. Each entry is referenced by the memory address to which it corresponds. For each entry (i.e., memory address) the cache directory entry contains information indicating coherency status of the corresponding memory address in the cache memory 110 of each node 101 of the multiprocessor system. The depicted embodiment illustrates cache status for a simple cache protocol in which an address is either exclusive (E), shared (S), or invalid (I) although other protocols are clearly within the scope of the invention. Regardless of the protocol that is implemented, the cache directory entry corresponding to a particular memory address indicates the cache coherency status of the memory address on all nodes of the system. Moreover, for any given memory address, there is only one cache directory 108 on which coherency status may be found. Thus, cache coherency information for any given memory address is found in one and only one place within the system. This architectural characteristic is leveraged in the present invention during selection of a target node.

The present invention is primarily concerned with function shipping and, more particularly, efficient function shipping to reduce memory latency. In conventional multi-node multiprocessor systems, the decision to ship a function is made by a compiler upon determining a pattern of memory use or re-use suggesting that a function is probably best executed on a remote node (a node other than the home node of the function). It is difficult, however, to determine the coherency status of all memory locations at compile time. This means that a compiler must make a best guess as to when and where to ship a function. In the event that a function is shipped to a node where, as it turns out, none of the function operands are local (i.e., valid in the node's cache memory), a double penalty is incurred. This double penalty includes the penalty associated with the time and bandwidth required to request that the function be executed on the remote node as well as the latency penalty that will be incurred when the function is executed on a node where none of the operands are local.

In one embodiment, the present invention relies on a compiler to determine when a function is to be shipped, but determines the target node at run time, based on the current location of data operands (i.e., the nodes on which the operands are in a valid state within the node's cache memory). In this embodiment, the system architecture is exposed to the compiler and the compiler is sufficiently advanced to recognize opportunities for function shipping based on data usage patterns discerned from the source code. Once the compiler determines that a particular function is to be shipped, the present invention is employed to select the node on which to execute it.

Portions of the present invention may be implemented as code or microcode that is executed by a cache directory 108. In this embodiment, the cache directories 108 of FIG. 1 each include a processor or microcontroller and a nonvolatile storage device to hold the code/microcode. Alternately, the system memory may itself be used to store the code and the directory microcontroller could have a small cache to keep a local copy close to it. The cache directories 108 preferably also include at least some volatile or scratch memory where the microcontroller code can keep local or stack variables. The processor executes code that, when used in conjunction with a table of directory entries such as the entries 161, 162 of FIG. 6, enables the directory to select an optimal target node and to send the function to the selected target node for execution.

Figure 2:
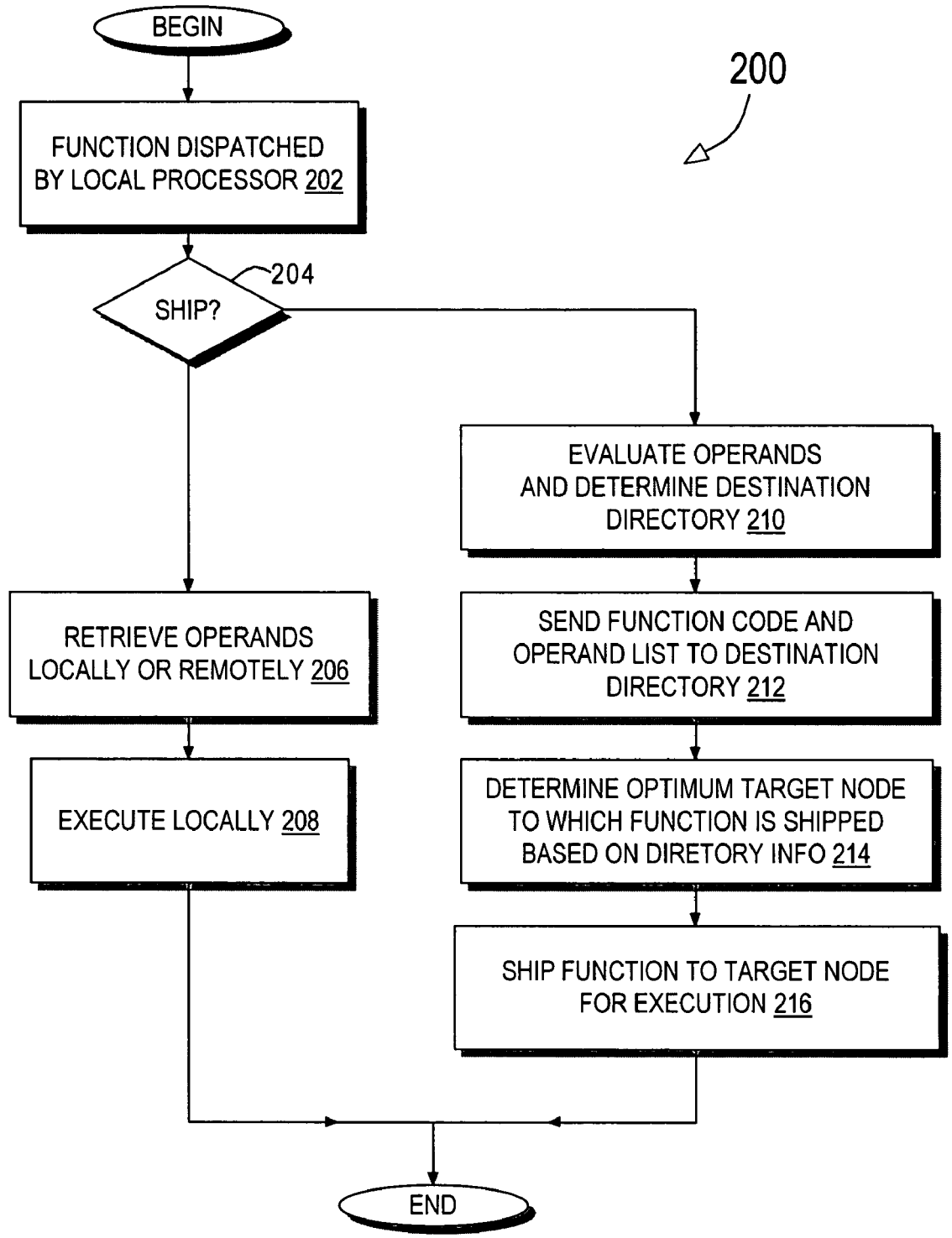
FIG. 2 is a flow diagram of a method of shipping functions in a multiprocessor system according to one embodiment of the present invention.

Turning now to FIG. 2, a flow diagram is presented to illustrate a method 200 of shipping a function from one node to another in a multi-node, multiprocessor system (such as the system 100 depicted in FIG. 1) according to one embodiment of the present invention. In the depicted embodiment, function shipping method 200 includes a function being dispatched (block 202) by a requesting processor. A determination is made (block 204) concerning whether to ship the function to another node or to execute the function on the function's home node. As stated previously, the determination of whether to ship the function may be made by a compiler before the code is ever executed.

In other embodiments, function shipping may be a run time decision that is allocated to the cache directories in conjunction with the determination of where to ship a function. Using a simple example to illustrate, one embodiment of system 100 makes a run time determination on whether to ship a function by determining whether any of the operands are local to the home node of the function (i.e., valid in the cache directory of the function's home node). At one extreme, function shipping is invoked only if all of the operands are invalid in the cache memory of the node from where the function shipping is initiated (the function's home node). At the other extreme, the function is shipped unless all of the operands are valid in the cache directory of the function's home node. In between these extremes are a myriad of embodiments in which some form of balancing of factors such as, for example, data locality, node loading, and node distance or proximity, is performed to determine whether to ship a function or not. Data locality, as used herein, refers to the cache memories 110 where data is valid. Although run time determination of whether to ship a function is complicated in a directory-based system because multiple cache directories have to be queried to determine the locality of all the function operands, it may be prove to be performance effective in a given application.

If the determination is made to execute a function on the function's home node (i.e., not ship it), whether by the compiler, the cache directories, or some other decision maker, function execution is performed in a conventional manner by retrieving (block 206) the data operands and executing the function on the home node (block 208). When operands are not valid in the cache directory of the function's home node, it will be appreciated that home node execution entails significant latency as the processor waits for data to be fetched from other nodes. The remaining portions of method 200 are dedicated to processing that is performed when a function is to be shipped.

Function shipping according to the present invention includes identifying (by the home node function) a destination node based on the home nodes of the list of operands and sending a message to the destination directory. The destination directory then selects a target node based on the current locality of the operands and ships the function to the selected target node for low latency execution. Typically, each node 101 of the system is enabled to ship a function to another node for execution. As illustrated in FIG. 2, method 200 includes evaluating the function operands to determine (block 210) a destination directory. The destination directory, as used herein, refers to a cache directory 108 that will select the target node by evaluating the current locality of the function's operands.

The fixed mapping between memory addresses and their home nodes facilitates selection of the destination directory. With statically mapped directories, the home node of the function can easily determine the home nodes for each of the function's operands. The destination directory, according to one embodiment, is simply the directory that is home to the greatest number of operands. If the function is of the form X=F(A,B), for example, the source operands are A and B and the lone result operand is X. If any of the nodes 101 is home node to all three of these operands (i.e., home node to the memory addresses for A, B, and X), the cache directory of that node is the destination directory that will select the target node where the function will be executed.

In cases where none of the nodes is home node for a majority of the operands, the destination directory may be identified based upon predetermined tie-breaking rules. As an example, the destination directory may be selected from a set of candidate directories based on the architectural proximity of the various directories to the home node of the function. The nodes within a multiprocessor network may not be architecturally equidistant from one another. Some nodes may be directly connected to each other via some form of direct interconnect while other nodes may have to traverse one or more intermediate nodes to communicate with each other. Nodes that are directly connected to each other can communicate with each other faster than nodes that must traverse an intermediate node to communicate. Using the X=F(A,B) example, if the home of A, B, and X are all different, but the home node for A is architecturally adjacent to the home node of the function while the home nodes for B and X are one or more "hops" away, the directory on node A is chosen as the destination directory.

Once the destination directory is selected, a "node determination" message is sent (block 212) from the home node of the function to the node on which the destination directory resides. The node determination message 140, as illustrated in the embodiment depicted in FIG. 4, is a data string that indicates the function to be performed with a function pointer or a function "handle", and a list of memory addresses corresponding to the function's operands. Presumably, the destination directory node is the home node for one or preferably more of the memory addresses (i.e., one or more of the operand memory addresses is in the range of memory addresses allocated to the destination directory node's system memory 104). In the depicted embodiment, the function itself is encoded within the message such that, for example, an ADD function encodes to a first value, a SUBTRACT function encodes to a second value. In this embodiment, the function encoding is preferably established at system startup. Another embodiment encompasses the shipping of complex functions such as C code snippets. In such cases, the snippets are referenced or identified within message 140 by a memory address. When the destination directory receives a message from the home node of a function requesting a function shipping determination, the destination directory invokes a node selection algorithm to select (block 214) the target node (i.e., the node where the function will be shipped and ultimately executed).

In some cases, the destination directory will be home to all of the operands required by the function. In such cases, the destination directory will have data locality information for every operand and will, therefore, be able to make the best target node determination possible. In other cases, the destination node is not the home node for one or more of the function operands. In these cases, the selected destination directory must either retrieve data locality information from the operand's home node or select a target node for function shipping without considering the home node of all of the operands. This is an implementation specific detail and either embodiment is within the scope of the invention. If retrieving data locality information from a home node of that information is relatively "cheap," it may be worthwhile to obtain the information so that the target node determination can be made based on the most complete set of information. In other cases, it may be sufficient to determine the target node based upon an incomplete set of data locality information.

The target node determination is based, according to the present invention, at least in part, on the current locality of the data operands needed by the function. Moreover, the target node determination is preferably made with reference to multiple data operands in an effort to reduce overall latency and improve performance. Thus, the target node determination according to one embodiment includes determining whether there is a predominant node. A predominant node, as used herein, is the node 101 whose cache memory 110 has valid copies of the greatest number of function operands. If, for example, valid copies of all data operands are present in one and only one cache memory 110, the corresponding node 101 becomes the leading candidate for the target node. In some cases, such as when there is no predominant node, factors other than data locality may be considered to prioritize a set of candidate nodes to determine the best target node. In one embodiment, for example, the architectural proximity of the various operands influences the determination of the target node. If, for example, hypothetical nodes A, B, C, and X each have at least some of a function's operands and A, B, C are architecturally close to each other and are all far from X, it may be desirable to select B as the candidate because it is closest to both A and C and can get quick access to most of the operands.

A conceptual representation of the elements used to select a target node in block 214 of FIG. 2 is presented in FIG. 5. As depicted in FIG. 5, target node determination is based on input rules 152 that indicate whether the target node determination, as discussed above, is to be made based on locality information for all operands or only those operands that have the destination directory node as their home. In addition, the depicted embodiment of the target node determination includes prioritization rules that guide the selection process when data locality is not determinative (i.e., there is no predominant node) or when some other factor overrides data locality even if there is a predominant node.

Prioritization rules 154 may include, as examples, rules that prioritize the locality of source operands over the locality of result operands (or vice versa) and rules that indicate how to evaluate factors not related to data locality. More specifically, the depicted embodiment of target node selection 214 includes or employs load information 156 and proximity information 158 to assist in the target node selection. Load information 156 is information that indicates, as its name suggests, relative amounts of processing load being experienced by the various nodes. Load information 156 may be periodically supplied to each directory 108 using a special purpose message for example. Nodes that have recently experienced significant loading may be de-prioritized as a target node for a function shipment even if the node would otherwise be considered as the best candidate node. Moreover, when there is no predominant node, loading information 156 can be used to select among two or more candidates that are equally attractive from the perspective of data locality. Similarly, architectural proximity information 158 indicates the relative architectural distance to each of the other nodes and may be used to select a node other than the predominant node or to select the closest node when there is no predominant node.

Target node determination 214, as depicted in FIG. 5, may also involve anticipatory cache policies that may not directly influence the current selection of a target node. Cache update policies 159 may involve, for example, a message requesting a target node to fetch data for any operands that were not local to the target node on the theory that the function may be shipped to the target node in the future and that complete data locality (all operands valid in the target node cache) is desirable.

Returning to FIG. 2, once a target node is selected in block 214, the function is shipped (block 216) to the target node for execution. The function may be shipped by simply forwarding the information contained in the node determination message to the target directory using a different message type (e.g., a function shipping message type or a pointer to the function to be executed).

It will be apparent to those skilled in the art having the benefit of this disclosure that the present invention comprises a system and method for efficient function shipping in a multiprocessor system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing node within a multi-node multiprocessor system, comprising:
    a processor connected to a system memory having a predetermined range of memory addresses;
    a cache memory connected to the processor; and
    a cache directory containing coherency status information for the range of memory addresses, wherein the cache directory is enabled to receive a message from a home node of a function, the message being indicative of the function and a list of operands and wherein a memory address for at least one of the operands is in the range of memory addresses; and wherein the cache directory is enabled to determine a target node based, at least in part, on the cache coherency status information and memory access latency evaluation and to ship the function to the determined target node for execution.

2. The node of claim 1, wherein the cache directory determines the target node by determining whether there is a predominant node based on the list of operands, wherein a cache memory of the predominant node contains valid copies of more of the operands than the cache memory of any other node in the system.

3. The node of claim 1, wherein the cache directory determines the target node by prioritizing a set of candidate nodes according to loading information indicative of the loading on each of the nodes.

4. The node of claim 1, wherein the cache directory determines the target node by prioritizing a set of candidate nodes, at least in part, based on proximity information indicative of the architectural proximity of the candidate node.

5. The node of claim 1, wherein the cache directory is further enabled to retrieve cache coherency information from a remote directory for at least one of the list of operands and to use the retrieved cache coherency information in determining the target node.

6. The node of claim 5, wherein the cache directory is further enabled to update the node's cache memory responsive to determining an operand in the list of operands that is not valid in the cache memory.

7. A multiprocessor system, comprising:

a plurality of data processing nodes, each node having a processor coupled to a system memory, a cache memory, and a cache directory wherein the cache directory contains cache coherency information for a predetermined range of system memory addresses and wherein each node is enabled to initiate a function shipping request;

an interconnection enabling the nodes to exchange messages;

wherein each node initiating a function shipping request is enabled to identify a destination directory based on the list of operands associated with the function and to send a node determination message indicating a function and a list of corresponding operands to the identified destination directory; and wherein each cache directory is enabled to determine a target node based, at least in part, on its cache coherency status information and memory access latency evaluation responsive to receiving the node determination message and to ship the function to the target node over the interconnection.

8. The system of claim 7, wherein a node initiating the request determines the destination directory by determining the directory that is the home directory to the greatest number of the list of operands.

9. The system of claim 7, wherein the destination directory determines the target node by determining whether there is a predominant node based on the list of operands, wherein the predominant node has a cache memory and further wherein the predominant node cache memory contains valid copies of more of the operands than the cache memory of any other node in the system.

10. The system of claim 9, wherein the destination directory determines the target node by prioritizing a set of candidate nodes when there is no predominant node, wherein the candidate nodes are prioritized according to loading information indicative of the loading on each of the nodes.

11. The system of claim 9, wherein the cache directory determines the target node by prioritizing a set of candidate nodes when there is no predominant node, wherein the candidate nodes are prioritized, at least in part, based on proximity information indicative of the architectural proximity of the candidate node.

12. The system of claim 7, wherein the destination directory is further enabled to retrieve cache coherency information from a remote directory for at least one of the list of operands and to use the retrieved cache coherency information in determining the target node.

13. The system of claim 12, wherein the destination directory is further enabled to update the node's cache memory responsive to determining an operand in the list of operands that is not valid in the cache memory.

14. A data processing system within a multi-node data processing network, comprising:

a microprocessor coupled to a system memory having a predetermined range of memory addresses;

a cache memory accessible to the processor;

a cache directory containing current cache coherency information for the range of memory addresses and further including means for receiving a list of memory addresses and for determining a target node from the list based, at least in part, on the cache coherency information and memory access latency evaluation.

15. The system of claim 14, wherein determining a target node includes determining the data locality of at least some of the operands wherein the data locality indicates on which cache directories within the multi-node system an operand is valid.

16. The system of claim 15, wherein determining a target node includes selecting a predominant node as the target node, wherein the predominant node contains valid copies of more function operands than any other node in the system.

17. The system of claim 14, wherein the system is further enabled to initiate a function shipping request and to identify an intermediate node on which to determine the target node for the request based on the home nodes of the request operands.

18. The system of claim 17, wherein the system identifies the intermediate node by identifying the node that is home node to the greatest number of operands.

19. The system of claim 18, wherein the system is further enabled to import cache coherency data for operands having home nodes that differ from the intermediate node, and to use the imported cache coherency data in determining the target node.

20. The system of claim 14, wherein determining the target node further includes determining the target node based on information including loading information and architectural proximity information.

* * * * *